(12) United States Patent
Imura et al.

(10) Patent No.: US 7,875,405 B2
(45) Date of Patent: Jan. 25, 2011

(54) SIDE-BY-SIDE FUEL CELLS

(75) Inventors: Shinichiro Imura, Hyogo (JP); Takashi Yasuo, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 27 days.

(21) Appl. No.: 12/153,764

(22) Filed: May 23, 2008

(65) Prior Publication Data
US 2008/0299435 A1 Dec. 4, 2008

(30) Foreign Application Priority Data
May 23, 2007 (JP) ............... 2007-137255

(51) Int. Cl.
*H01M 4/64* (2006.01)
*H01M 2/20* (2006.01)
(52) U.S. Cl. ..................... 429/517; 429/468
(58) Field of Classification Search ............ 429/12–46, 429/400–535, 468, 517
See application file for complete search history.

(56) References Cited

U.S. PATENT DOCUMENTS

| 6,074,781 | A | * | 6/2000 | Jurca ................... 429/209 |
| 2005/0250004 | A1 | | 11/2005 | McLean et al. |

FOREIGN PATENT DOCUMENTS

JP 2004-146092 5/2004

OTHER PUBLICATIONS

Machine Translation of JP 2004-146092 originally published May 20, 2004 to Shin et al.*
Human Translation of JP 2004-146092 originally published to Morishima et al., May 2004.*

* cited by examiner

*Primary Examiner*—Ula C Ruddock
*Assistant Examiner*—Jonathan G Leong
(74) *Attorney, Agent, or Firm*—McDermott Will & Emery LLP

(57) ABSTRACT

A membrane electrode assembly is used for a planer type fuel cell. The membrane electrode assembly includes an electrolyte membrane, anodes and cathodes disposed counter to the anodes. Ends of current collectors are connected to one side of the anodes, respectively. Ends of current collectors are connected to one side of the cathodes, respectively. On a cathode side, the current collectors are provided in positions opposed respectively to the insulators provided on an anode side with the electrolyte membrane interposed in between. A cathode-side current collection and an anode-side current collector are connected by an interconnector, and adjacent cells are electrically connected in series with each other.

6 Claims, 18 Drawing Sheets

20

SIDE-BY-SIDE FUEL CELLS

CROSS-REFERENCE TO RELATED APPLICATIONS

This application is based upon and claims the benefit of priority from the prior Japanese Patent Application No. 2007-137255, filed on May 23, 2007, the entire contents of which are incorporated herein by reference.

BACKGROUND OF THE INVENTION

1. Field of the Invention

The present invention relates to a fuel cell. More particularly, the invention relates to a fuel cell with its cells disposed in a planar arrangement.

2. Description of the Related Art

A fuel cell is a device that generates electricity from hydrogen and oxygen so as to obtain highly efficient power generation. A principal feature of a fuel cell is its capacity for direct power generation which does not undergo a stage of thermal energy or kinetic energy as in conventional power generation. This presents such advantages as high power generation efficiency despite the small scale setup, reduced emission of nitrogen compounds and the like, and environmental friendliness on account of minimal noise or vibration. A fuel cell is capable of efficiently utilizing chemical energy in its fuel and, as such, environmentally friendly. Fuel cells are therefore envisaged as an energy supply system for the twenty-first century and have gained attention as a promising power generation system that can be used in a variety of applications including space applications, automobiles, mobile devices, and large and small scale power generation. Serious technical efforts are being made to develop practical fuel cells.

In particular, polymer electrolyte fuel cells feature lower operating temperature and higher output density than the other types of fuel cells. In recent years, therefore, the polymer electrolyte fuel cells have been emerging as a promising power source for mobile devices such as cell phones, notebook-size personal computers, PDAs, MP3 players, digital cameras, and electronic dictionaries and books. Well known as the polymer electrolyte fuel cells for mobile devices are planar fuel cells, which have a plurality of single cells arranged in a plane. And as a fuel to be used for this type of fuel cells, hydrogen stored in a hydrogen storage alloy or a hydrogen cylinder, as well as methanol, is the subject of continuing investigations.

With a planar fuel cell with its cells arranged in a plane, current collectors are installed in contact with the surfaces of electrodes (anodes and cathodes) to collect electric power from the respective cells. In such an arrangement where the current collectors provided in contact with the surfaces of electrodes, the current collectors must be pressed against the electrodes by screws or other fastening members to ensure stable contact between the electrodes and the current collectors. As a result, the portions occupied by the fastening means present an impediment to attempts at further downsizing the fuel cell.

SUMMARY OF THE INVENTION

The present invention has been made in view of the foregoing problems, and a general purpose thereof is to provide a technology to further downsize a planar fuel cell.

One embodiment of the present invention relates to a fuel cell. The fuel cell comprises: a plurality of cells arranged in a plane, each cell having an electrolyte membrane, an anode provided on one face of the electrolyte membrane and a cathode provided on the other face of the electrolyte membrane; and an electrical connector which connects the cells disposed adjacent to one another, wherein the electrical connector is in contact with an entire or partial periphery of the anode and cathode so as to electrically connect the electrical connector to the anode and the cathode of each cell. Here, the electrical connector may be a conductive member such as a current collector and an interconnector.

By employing this embodiment, contact between the electrodes (anodes and cathodes) and the current collectors is accomplished on the entire or partial periphery of the electrodes, so that there is no need for fastening members that are otherwise required to bring the current collectors into contact with the surfaces of the electrodes. As a result, further downsizing of the fuel cell can be achieved.

In the fuel cell according to the foregoing embodiment, the electrical connector may be bent and projected to either one of a face of the anode and a face of the cathode.

In the fuel cell according to the foregoing embodiment, the electrical connector may be projected to the face of the anode, and at least a part of the cathode may be convex relative to the electrical connector connected to the periphery thereof.

In the fuel cell according to the foregoing embodiment, the electrical connector may include an interconnector which electrically connects the adjacent cells in series, and the interconnector may be formed between the adjacent cells.

It is to be noted that any arbitrary combinations or rearrangement, as appropriate, of the aforementioned constituting elements and so forth are all effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

The preferred embodiments of the present invention will now be described with reference to the accompanying drawings.

First Embodiment

Figure 1:
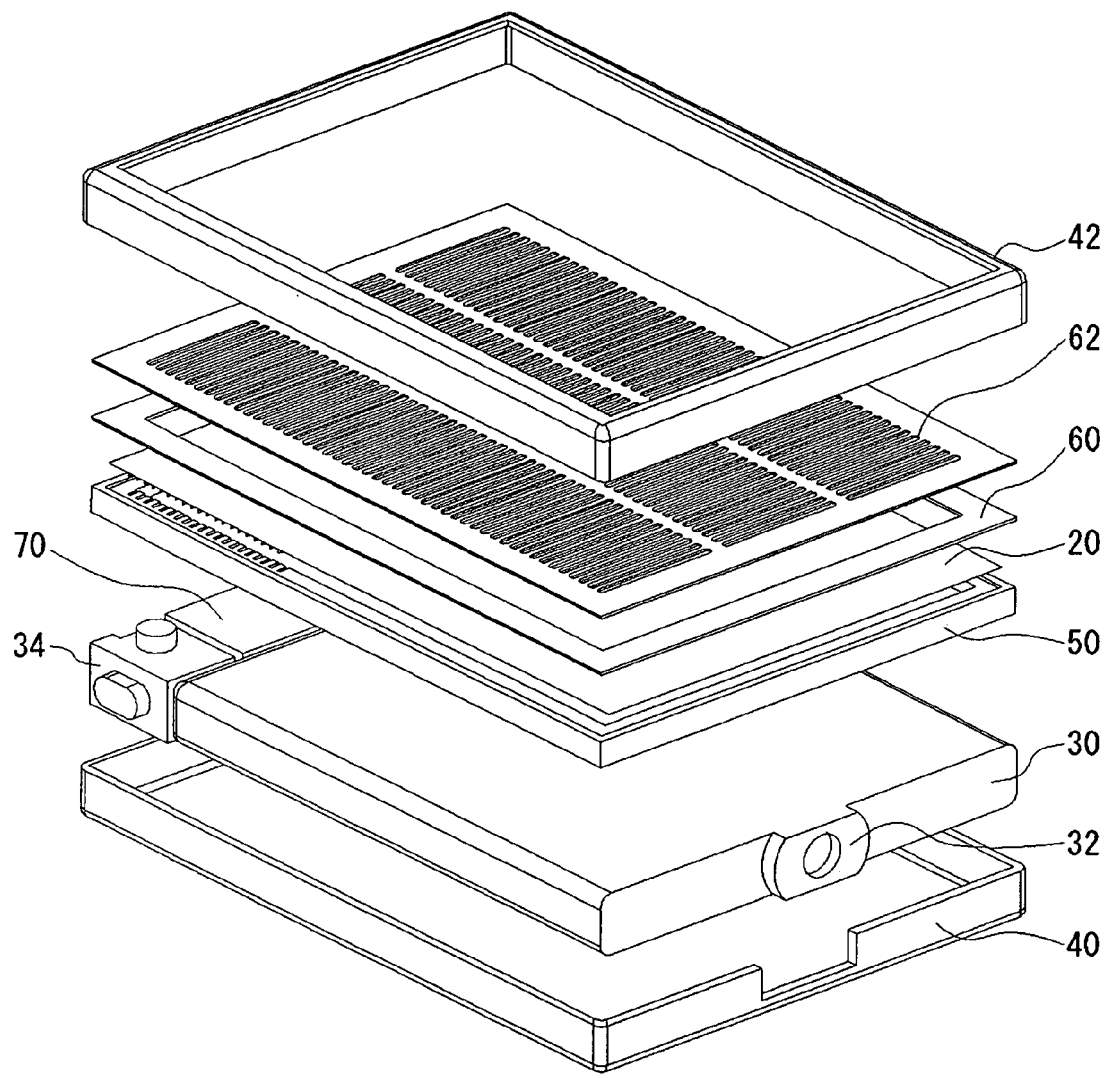
FIG. 1 is an exploded perspective view of a fuel cell according to a first embodiment of the present invention.

FIG. 1 is an exploded perspective view of a fuel cell according to a first embodiment of the present invention. A fuel cell 10 includes a membrane electrode assembly 20, a hydrogen storage alloy tank 30, an anode housing 40, and a cathode housing 42. A detailed structure of the membrane electrode assembly 20 will be discussed later, and a general outline structure of the fuel cell 10 will now be described.

Provided on one face of the membrane electrode assembly 20 is an anode housing 40, and anode-side components are housed in the anode housing 40. More specifically, an anode cover 50 and a hydrogen storage alloy tank 30 are installed on the anode-side face of the membrane electrode assembly 20.

The anode cover 50 forms a space, in which hydrogen is filled, facing the anodes of the membrane electrode assembly 20. Housed in the hydrogen storage alloy tank 30 is a hydrogen storage alloy which can store hydrogen within itself (e.g., rare-earth Mm (misch metal) $Ni_{4.32}Mn_{0.18}Al_{0.1}Fe_{0.1}Co_{0.3}$). Note that the hydrogen storage alloy is not limited to a rare-earth type, but may include a Ti—Mn, Ti—Fe, Ti—Zr, Mg—Ni or Zr—Mn type, for instance.

The hydrogen storage alloy tank 30 is provided with a fuel supply inlet 32 which can be connected to an external cylinder (not shown) storage hydrogen to be supplied. With the external cylinder connected to the fuel supply inlet 32, hydrogen can be supplied to the hydrogen storage allow housed in the hydrogen storage alloy tank 30.

The hydrogen stored in the hydrogen storage alloy tank 30 is supplied to the anodes in the membrane electrode assembly 20 via a regulator 34. The regulator 34 reduces the pressure of hydrogen supplied to the anodes, thereby protecting the anodes, when hydrogen is supplied to the hydrogen storage alloy from the external cylinder and when hydrogen is discharged from the hydrogen storage alloy.

Also, a control circuit 70 is housed in the anode housing 40. The control circuit 70 includes electric circuitry of a DC-DC converter and the like capable of adjusting the voltage generated by the fuel cell 10 and outputting a predetermined level of voltage to the exterior.

On the other hand, provided on the other face of the membrane electrode assembly 20 is a cathode housing 42, and cathode-side components are housed in the cathode housing 42. More specifically, a meshed cathode filter 62 is installed on the cathode-side face of the membrane electrode assembly 20 with a packing 60 placed between them. The cathode filter 62 removes dust in the air taken in from outside.

Figure 2:
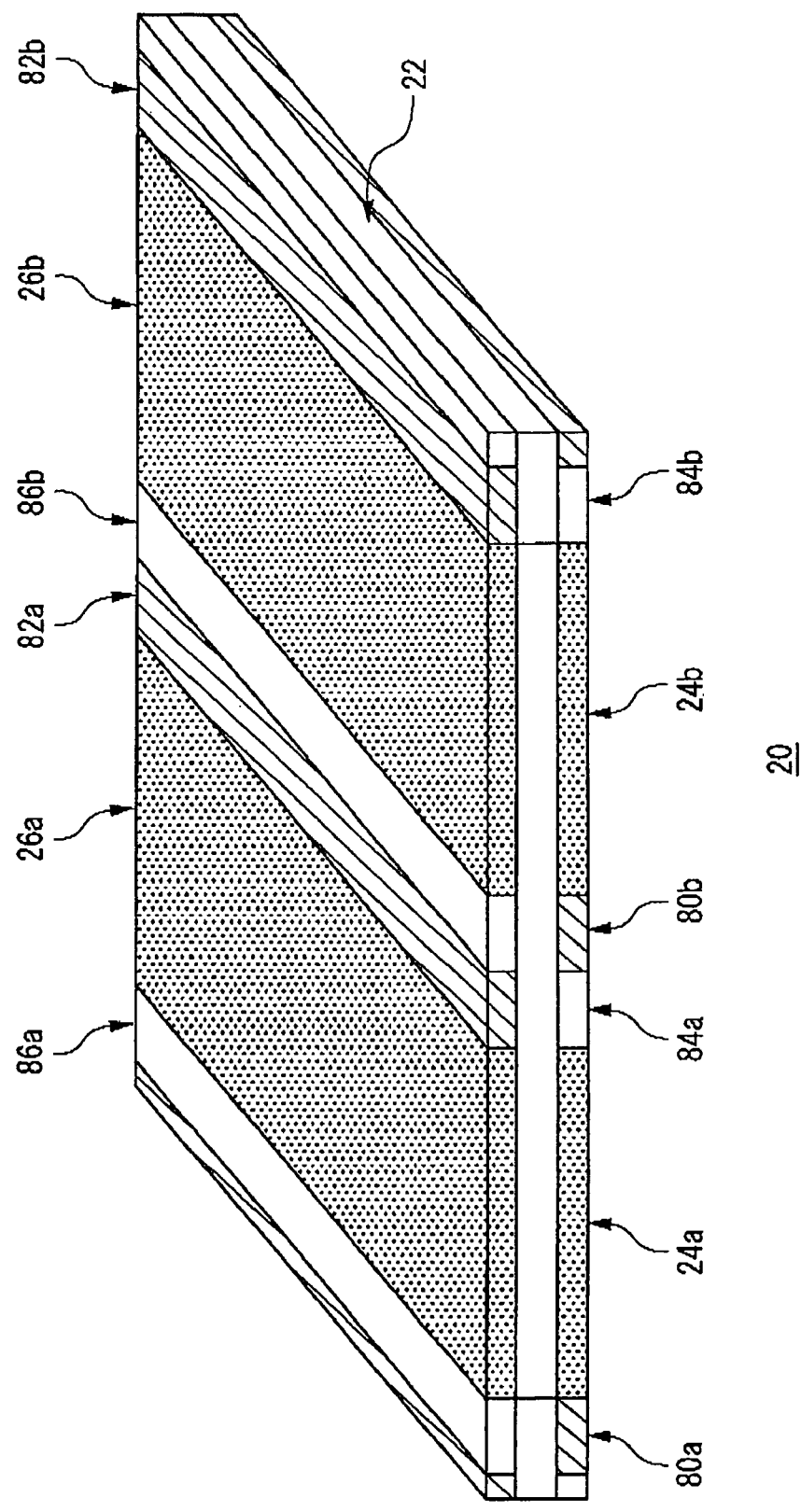
FIG. 2 is a perspective view showing essential parts of a membrane electrode assembly as used in a first embodiment of the present invention.

FIG. 2 is a perspective view showing the essential parts of the membrane electrode assembly 20. The membrane electrode assembly 20 includes an electrolyte membrane 22, anodes 24a and 24b, and cathodes 26a and 26b in positions opposite to the anodes 24a and 24b respectively. In other words, a plurality of cells are formed in a planar arrangement in the membrane electrode assembly 20. Hydrogen is supplied to the anodes 24a and 24b from the hydrogen storing alloy tank 30. Air is supplied to the cathodes 26a and 26b. The fuel cell 10 produces electric power by an electrochemical reaction between the hydrogen and the oxygen in the air. It is to be noted that while the example of the membrane electrode assembly shown in FIG. 2 has two cells only, the number of cells may be arbitrary. Also, a plurality of cells may be arranged in a matrix in a plane.

The anodes 24a and 24b are disposed on one face of the electrolyte membrane 22 in such a manner that they are spaced apart from each other. In the present embodiment, connected to one side of the peripheries of the anodes 24a and 24b are current collectors 80a and 80b, respectively. And insulators 84a and 84b are provided on the side of the anodes 24a and 24b opposite to the side where the current collectors 80a and 80b are provided. Between adjacent anodes, the insulators 84a and 84b each insulate a current collector connected to one of the adjacent anodes against the other of the anodes.

On the other hand, the cathodes 26a and 26b are disposed on the other face of the electrolyte membrane 22 in such a manner that they are spaced apart from each other. As with the anodes, connected to one side of the peripheries of the cathodes 26a and 26b are current collectors 82a and 82b, respectively. On the cathode side, however, the current collectors 82a and 82b are respectively disposed in positions opposite to the insulators 84a and 84b provided on the anode side with the electrolyte membrane 22 interposed in between. And insulators 86a and 86b are provided on the side of the cathodes 26a and 26b opposite to the side where the current collectors 82a and 82b are provided. Between adjacent cathodes, the insulators 86a and 86b each insulate a current collector connected to one of the adjacent cathodes against the other of the cathodes.

Note that both the current collectors 80a and 80b and the current collectors 82a and 82b may be made of a metal, such as aluminum, gold or platinum, or a conductive material made of carbon.

A current collector 80 on the anode side of one of adjacent cells is electrically connected to a current collector 82 on the cathode side of the other of the adjacent cells by an interconnector (not shown) provided on an end of the membrane electrode assembly 20. In the example of FIG. 2, the current collector 80b and the current collector 82a are connected to each other by an interconnector. In this manner, the cells are electrically coupled with each other in series.

The electrolyte membrane 22, which preferably shows excellent ion conductivity in a moist condition, functions as an ion-exchange membrane for the transfer of protons between the anodes 24 and the cathodes 26. The electrolyte membrane 22 is formed of a solid polymer material such as a fluorine-containing polymer or a nonfluorine polymer. The material that can be used is, for instance, a sulfonic acid type perfluorocarbon polymer, a polysulfone resin, a perfluorocarbon polymer having a phosphonic acid group or a carboxylic acid group, or the like. An example of the sulfonic acid type perfluorocarbon polymer is Nafion 112 (made by DuPont: registered trademark). Also, an example of the nonfluorine polymer is a sulfonated aromatic polymer ether ketone, polysulfone or the like.

The anodes 24a and 24b and the cathodes 26a and 26b are each constituted by a catalyst layer containing an ion-exchange resin and catalyst particles.

The ion-exchange resin, which connects the catalyst particles and the electrolyte membrane 22, plays a role of transferring protons therebetween. The ion-exchange resin may be formed of a polymer material similar to that of the electrolyte membrane 22. The catalyst may be, for instance, any one of or an alloy of any two of platinum, ruthenium, rhodium and the like, or the catalyst may be one supported by carbon.

With a fuel cell according to the present embodiment, contact between the electrodes (anodes and cathodes) and the current collectors is accomplished on the periphery of the electrodes, so that there is no need for fastening means that are conventionally required to bring the current collectors into contact with the surfaces of the electrodes. As a result, further downsizing of the fuel cell can be achieved.

Also, the current collectors are placed along one side of the electrodes, so that the profile area of the current collectors can be made smaller and correspondingly the area of the cells (power generating area) can be made larger.

Second Embodiment

Figure 3:
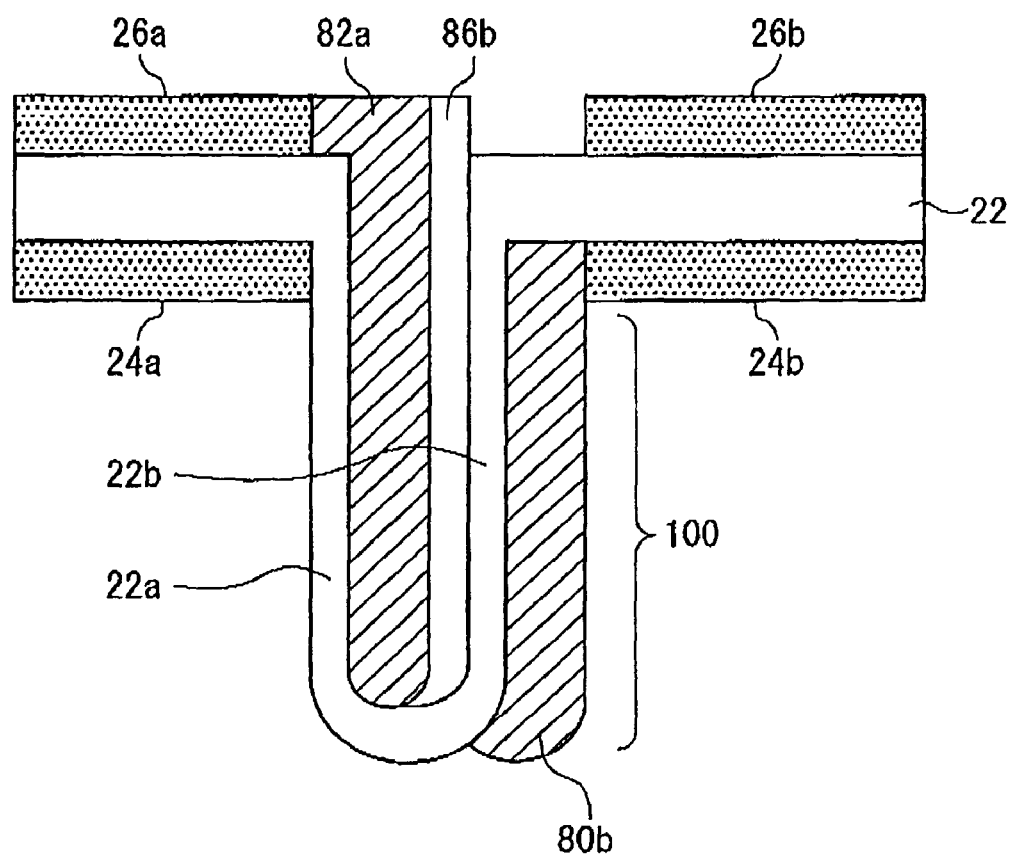
FIG. 3 is a cross-sectional view showing essential parts of a structure of a membrane electrode assembly as used in a second embodiment.

The structure of a fuel cell according to a second embodiment of the present invention is the same as that of the first embodiment with the exception of the membrane electrode assembly. FIG. 3 is a cross-sectional view showing the essential parts of a structure of a membrane electrode assembly of a fuel cell according to the second embodiment. The membrane electrode assembly 20 according to the second embodiment has a projection 100 projecting to the anode side between adjacent cells. At the projection 100, an electrolyte membrane 22 is folded back. The extension of a current collector 82a in contact with a cathode 26a is embedded between the folded-back portions of the electrolyte membrane 22. Between the folded-back portions of the electrolyte membrane 22, the extension of the current collector 82a is in contact with an electrolyte membrane 22a on the cathode 26a side and spaced apart from an electrolyte membrane 22b on the cathode 26b side. Also, embedded between the current collector 82a and the electrolyte membrane 22b is an insulator 86b. The insulator 86b insulates the current collector 82a and the electrolyte membrane 22b against each other. On the anode side, the extension of a current collector 80b in contact with an anode 24b is provided along the electrolyte membrane 22b. It should be noted that the diffusivity of air at the cathode is assured in this embodiment because the projection (electricity connecting means or electrical connector) projects to the anode side.

According to the second embodiment, the cross-sectional area of the current collectors can be made larger without widening the spacing between the cells (without losing the area efficiency of power generation), thus reducing the voltage loss due to the resistance in the current collectors.

Figure 4:
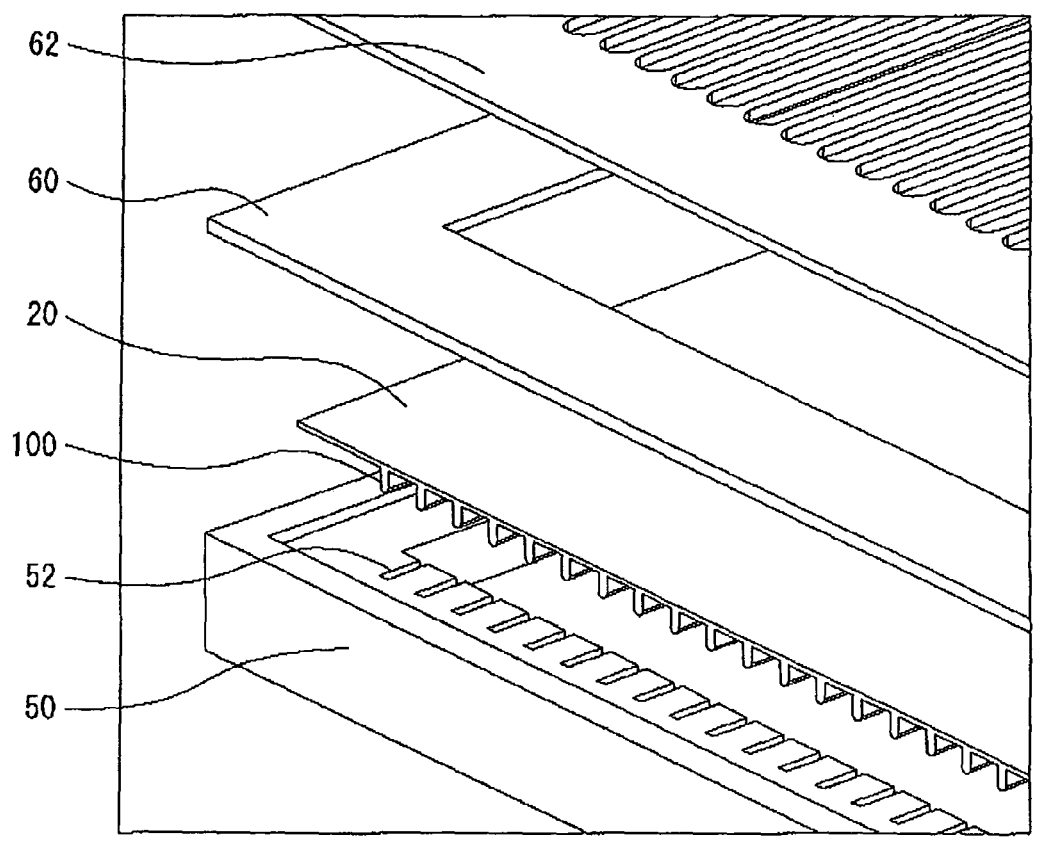
FIG. 4 is an exploded perspective view showing essential parts of a fuel cell according to a second embodiment.

Note also that when projections 100 are to be provided on the membrane electrode assembly 20 as in this embodiment, it is preferable that, as shown in FIG. 4, groves 52, into which the projections 100 can be inserted, be formed in the anode cover 50. In this manner, the projections 100 can be secured stably.

Third Embodiment

Figure 5:
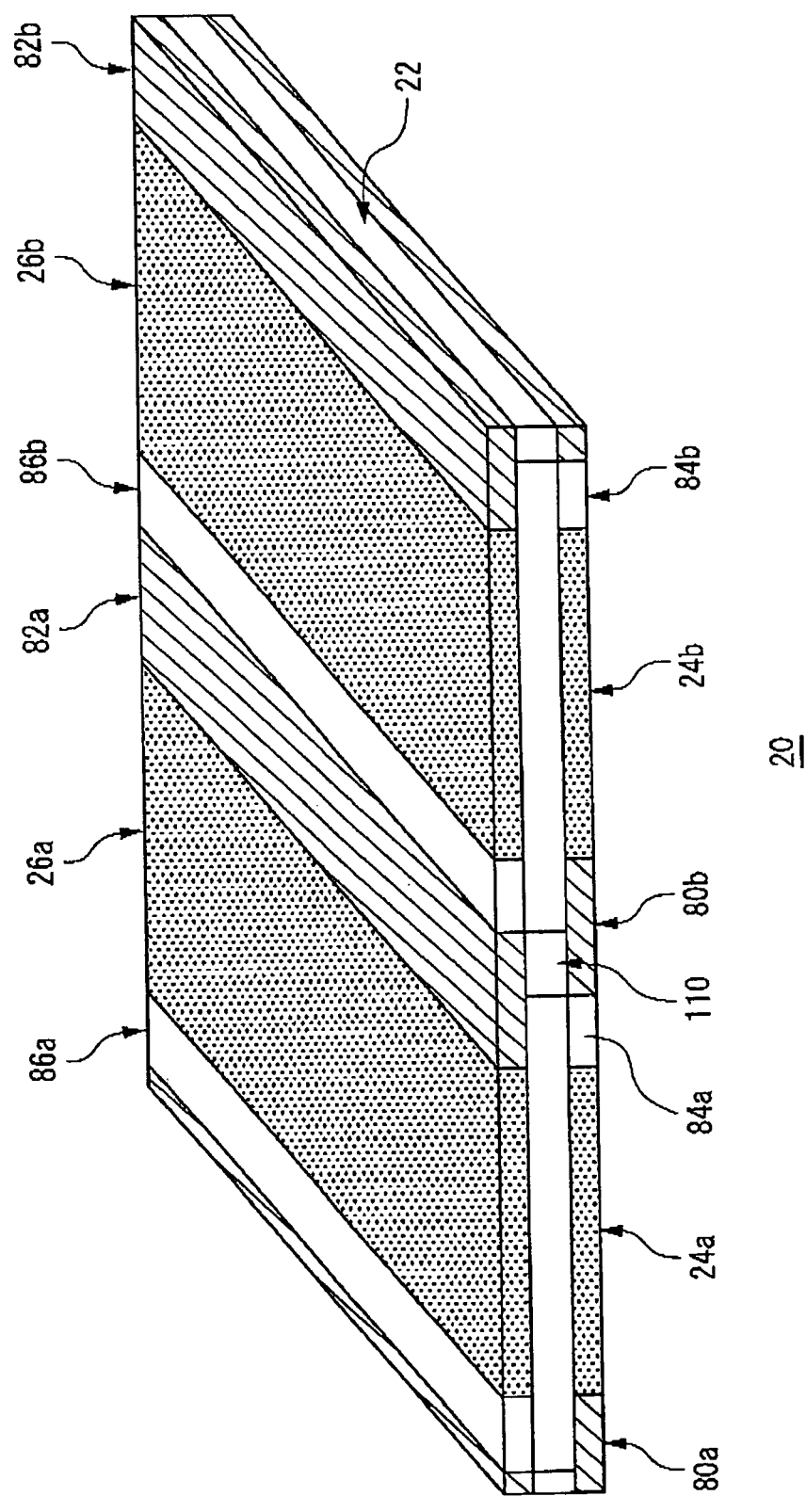
FIG. 5 is a perspective view showing essential parts of a structure of a membrane electrode assembly as used in a third embodiment.

The structure of a fuel cell according to a third embodiment of the present invention is the same as that of the first embodiment with the exception of the membrane electrode assembly. With the fuel cell of the first embodiment, an interconnector is provided on one end of the membrane electrode assembly 20 to electrically connect the cells in series, but the means to connect the cells in series is not limited to such an arrangement. With the membrane electrode assembly 20 according to the third embodiment, an interconnector 110 is disposed between adjacent cells as shown in FIG. 5. More specifically, a current collector 80b and a current collector 82a are more extended than in the first embodiment such that the current collector 80b on the anode side and the current collector 82a on the cathode side are disposed counter to each other between the adjacent cells. Thus, the interconnector 110, disposed between the current collector 80b and the current collector 82a, connects the current collector 80b and the current collector 82a electrically.

According to the third embodiment, an interconnector is not provided on one end of the membrane electrode assembly 20 but between adjacent cells, so that the electron transfer distance is smaller and thus the voltage loss due to resistance in the current collectors can be further reduced.

Fourth Embodiment

Figure 6:
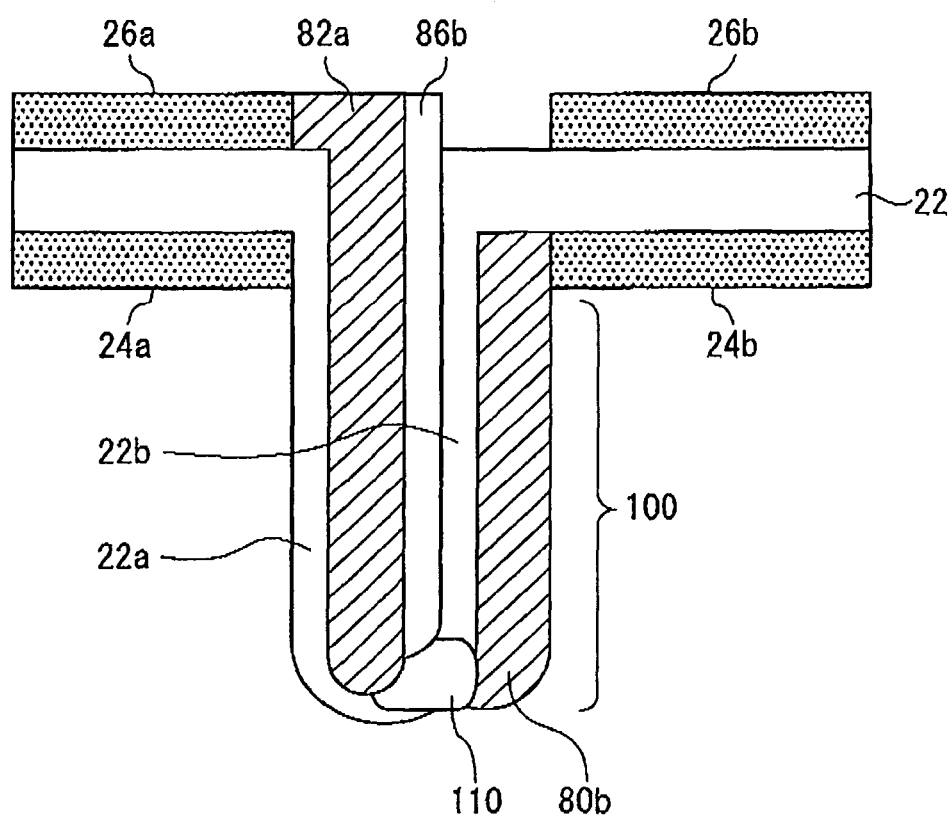
FIG. 6 is a cross-sectional view showing essential parts of a structure of a membrane electrode assembly as used in a fourth embodiment.

The structure of a fuel cell according to a fourth embodiment of the present invention is the same as that of the first embodiment with the exception of the membrane electrode assembly. FIG. 6 is a cross-sectional view showing the essential parts of a structure of a membrane electrode assembly as used in the fourth embodiment. The membrane electrode assembly 20 according to the fourth embodiment has a projection 100 projecting to the anode side between adjacent cells the same way as in the second embodiment. In this fourth embodiment, however, an interconnector 110 provided between the cells penetrates an electrolyte membrane 22 at the projection 100. The interconnector 110 electrically connects a current collector 80b on the anode side and a current collector 82a on the cathode side.

According to the fourth embodiment, in addition to the advantageous effects of the third embodiment, the cross-sectional area of the current collectors can be made larger without widening the spacing between the cells (without losing the power generation area efficiency), thus reducing the voltage loss due to resistance in the current collectors.

Fifth Embodiment

Figure 7:
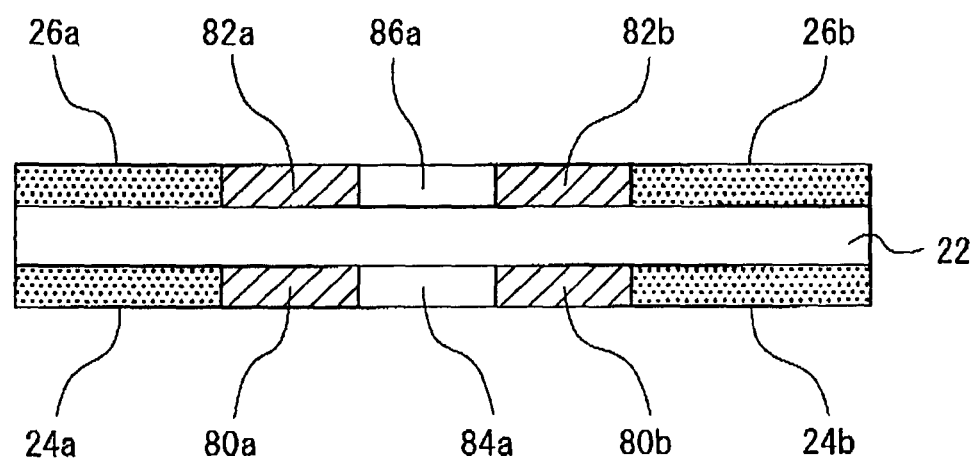
FIG. 7 is a cross-sectional view showing essential parts of a structure of a membrane electrode assembly as used in a fifth embodiment.

The structure of a fuel cell according to a fifth embodiment of the present invention is the same as that of the first embodiment with the exception of the membrane electrode assembly. Although the current collectors are provided along one side of electrodes in each cell in the first to fourth embodiments, the current collectors in this fifth embodiment are provided on the whole perimeter (four sides) of electrodes in each cell. In other words, the current collectors are in contact with all the sides of the perimeter of electrodes. FIG. 7 is a cross-sectional view showing the essential parts of a structure of a membrane electrode assembly as used in the fifth embodiment. In this fifth embodiment, current collectors 80a and 80b are provided on the whole perimeter of anodes 24a and 24b, respectively, and are thus in contact with the four side faces of the anodes 24a and 24b. Likewise, current collectors 82a and 82b are provided on the whole perimeter of cathodes 26a and 26b, respectively, and are thus in contact with the four side faces of the cathodes 26a and 26b. Between the adjacent cells, the current collector 80a and the current collector 80b are insulated against each other by an insulator 84a. Likewise, the current collector 82a and the current collector 82b are insulated against each other by an insulator 86a. A current collector 80 on the anode side of one of adjacent cells is electrically connected to a current collector 82 on the cathode side of the other of the adjacent cells by an interconnector (not shown) provided on an end of the membrane electrode assembly 20. In this manner, the cells are electrically coupled with each other in series.

Thus, the current collectors are in contact with all the four sides of the perimeter of the electrodes, so that the size (width) of the cells can be made larger without any loss of current collecting performance. Also, the symmetrical disposition of a current collector relative to an electrode ensures dispersion of electrons (current) and high current collection.

Sixth Embodiment

Figure 8:
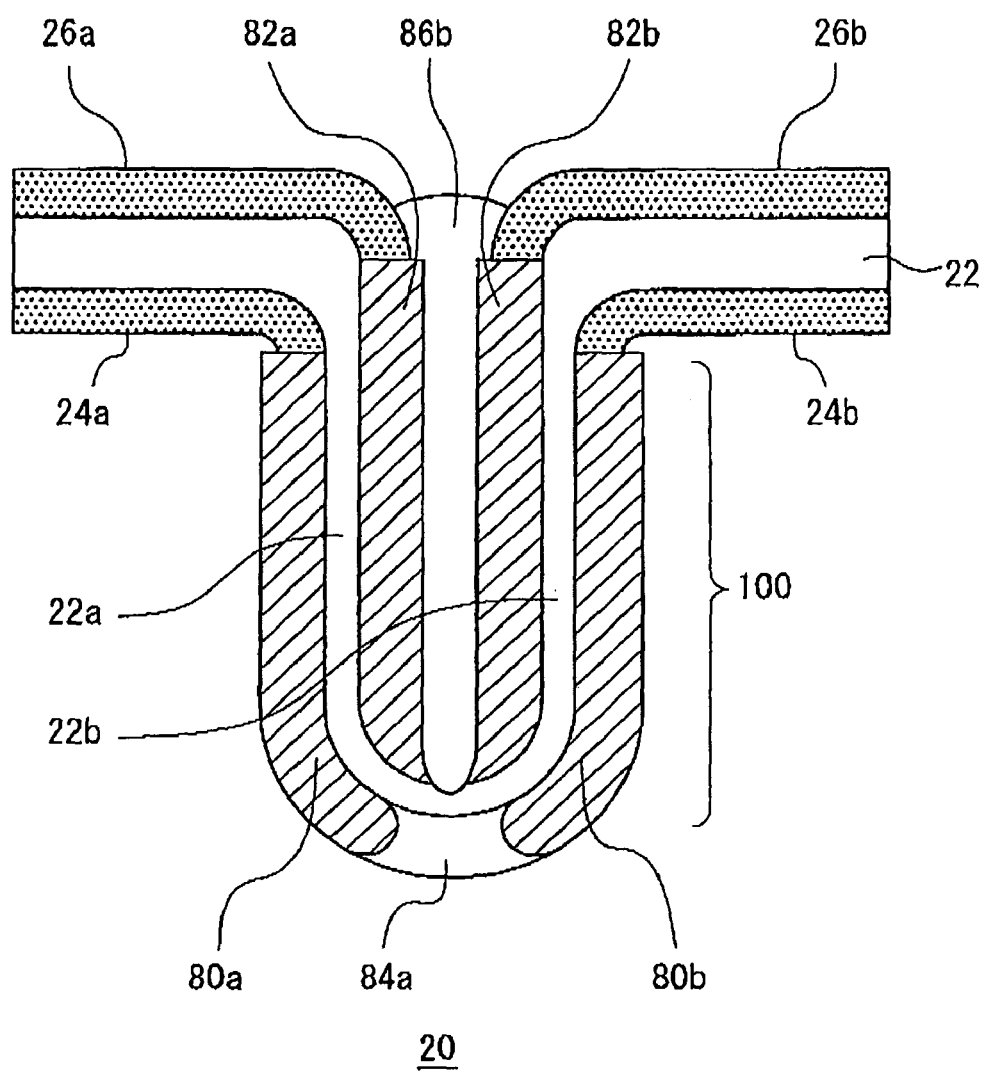
FIG. 8 is a cross-sectional view showing essential parts of a structure of a membrane electrode assembly as used in a sixth embodiment.

FIG. 8 is a cross-sectional view showing the essential parts of a structure of a membrane electrode assembly as used in a sixth embodiment of the present invention. In this sixth embodiment, the membrane electrode assembly, which is the same as in the fifth embodiment, has a projection 100 projecting to the anode side between adjacent cells. At the projection 100, an electrolyte membrane 22 is folded back. The extension of a current collector 82a in contact with a cathode 26a is embedded between the folded-back portions of the electrolyte membrane 22. Between the folded-back portions of the electrolyte membrane 22, the extension of the current collector 82a is in contact with an electrolyte membrane 22a on the cathode 26a side and spaced apart from an electrolyte membrane 22b on the cathode 26b side. In a similar manner, the extension of a current collector 82b in contact with a cathode 26b is embedded between the folded-back portions of the electrolyte membrane 22. Between the folded-back portions of the electrolyte membrane 22, the extension of the current collector 82b is in contact with an electrolyte membrane 22b on the cathode 26b side and spaced apart from an electrolyte membrane 22a on the cathode 26a side. Also, between the folded-back portions of the electrolyte membrane 22, an insulator 86a is embedded between the current collector 82a and the current collector 82b. The insulator 86a insulates the current collector 82a and the current collector 82b against each other.

On the anode side, the extension of a current collector 80a in contact with an anode 24a is provided along the electrolyte membrane 22a. And the extension of a current collector 80b in contact with an anode 24b is provided along the electrolyte membrane 22b. The current collector 80a and the current collector 80b are insulated against each other by an insulator 84a.

(Fabrication Method 1 of Membrane Electrode Assembly)

Figure 9A:
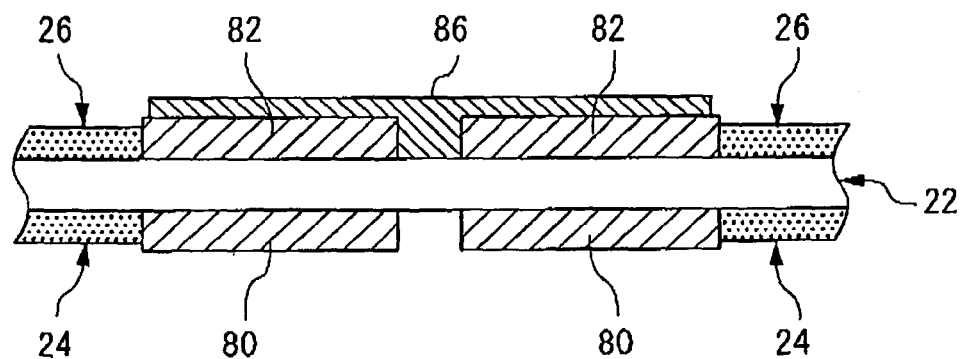
FIGS. 9A and 9B are process diagrams showing a fabrication method of a membrane electrode assembly according to a sixth embodiment.

FIG. 9 is a process diagram showing a fabrication method of a membrane electrode assembly according to the sixth embodiment. First, as shown in FIG. 9A, a plurality of cathodes (catalyst layer) 26 are formed at predetermined intervals on one face of an electrolyte membrane 22, and a plurality of anodes (catalyst layer) 24 at predetermined intervals corresponding to the cathodes on the other face thereof by a printing process. Also, between adjacent cathodes, a pair of current collectors 82, which are disposed around the respective cathodes and thus connected to each side of the cathode periphery, are formed, and then an insulator 86 is formed in such a manner as to cover the pair of current collectors 82. Also, between adjacent anodes, a pair of current collectors 80, which are disposed around the respective anodes and thus connected to each side of the anode periphery, are formed.

Figure 9B:
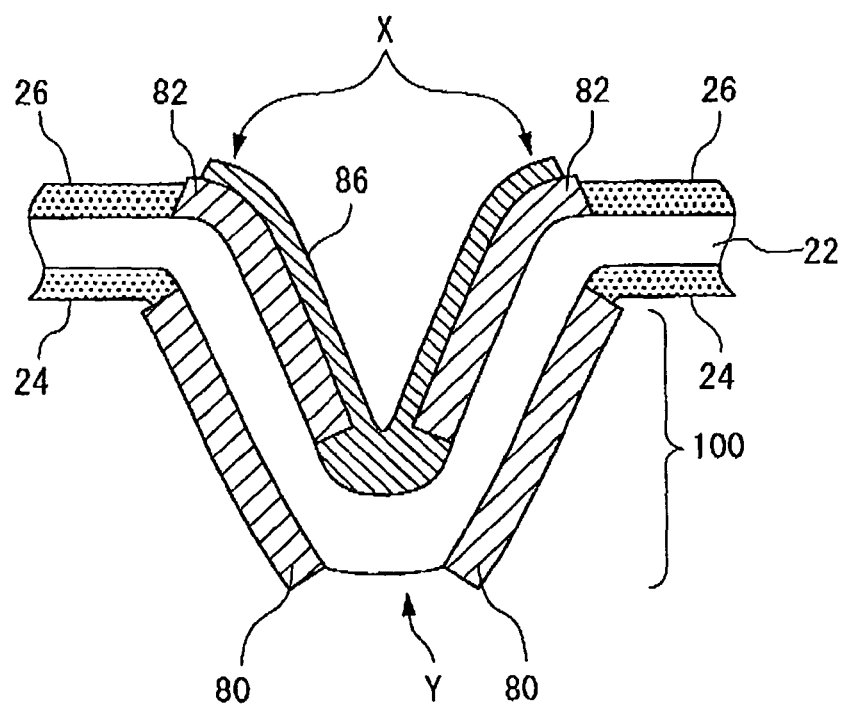

Next, as shown in FIG. 9B, a projection 100 is projected on the anode side by folding the electrolyte membrane 22 at the middle point between the adjacent cathodes. Then portions X (ends of the insulator 86) shown in FIG. 9B are bonded together, using an adhesive paste or the like having insulation properties. An insulator is formed in a region Y so as to insulate the current collectors 80 against each other between the adjacent cells. Through the processes as described above, a membrane electrode assembly as used in the sixth embodiment can be formed.

(Fabrication Method 2 of Membrane Electrode Assembly)

Figure 10A:
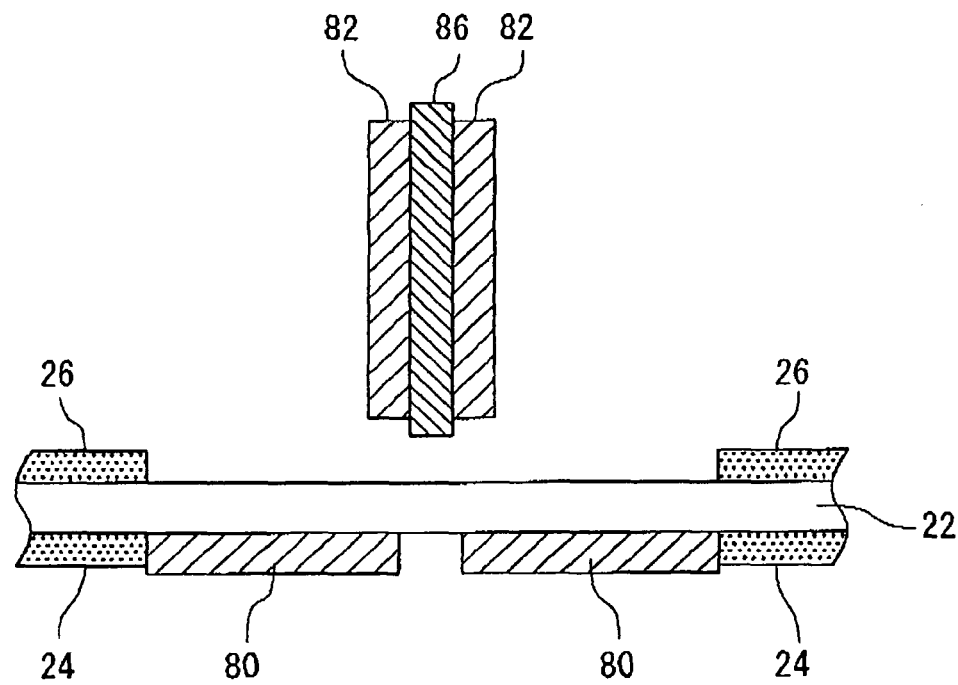
FIGS. 10A and 10B are process diagrams showing another fabrication method of a membrane electrode assembly according to the sixth embodiment.

FIG. 10 is a process diagram showing another fabrication method of a membrane electrode assembly according to the sixth embodiment. First, as shown in FIG. 10A, a component member comprising an insulator 86 with current collectors 82 formed on both faces thereof is prepared in advance. On the other hand, a plurality of cathodes (catalyst layer) 26 are formed at predetermined intervals on one face of an electrolyte membrane 22. And a plurality of anodes (catalyst layer) 24 are formed at predetermined intervals corresponding to the cathodes on the other face thereof. Between adjacent anodes, a pair of current collectors 80, which are disposed around the respective-anodes and thus connected to each side of the anode periphery, are formed.

Figure 10B:
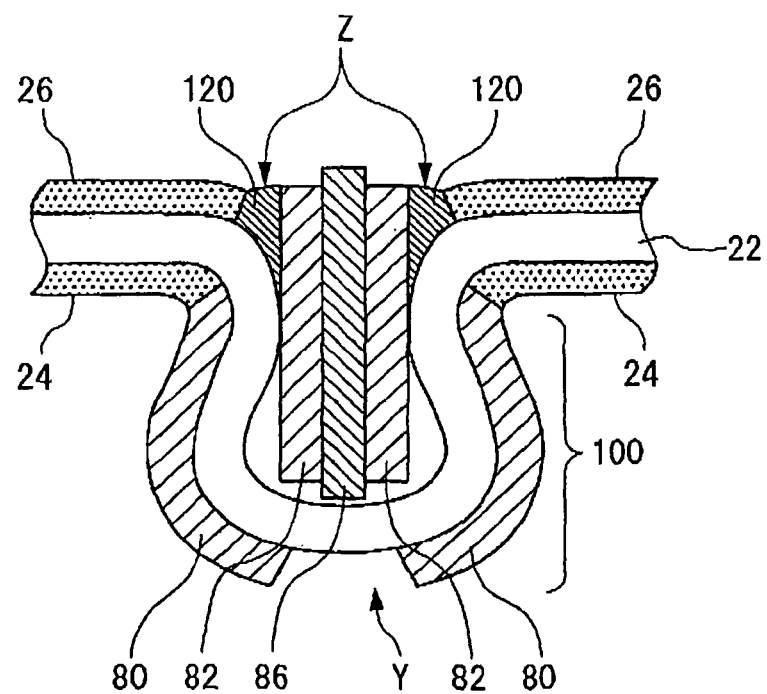

Next, as shown in FIG. 10B, a projection 100 is projected on the anode side by folding the electrolyte membrane 22 at the middle point between the adjacent cathodes. Then, bonding portions Z between the current collectors 82 and the sides of the cathodes 26 are formed by applying a conductive paste 120. Also, an insulator is formed in a region Y so as to insulate the current collectors 80 against each other between the adjacent cells.

Seventh Embodiment

Figure 11:
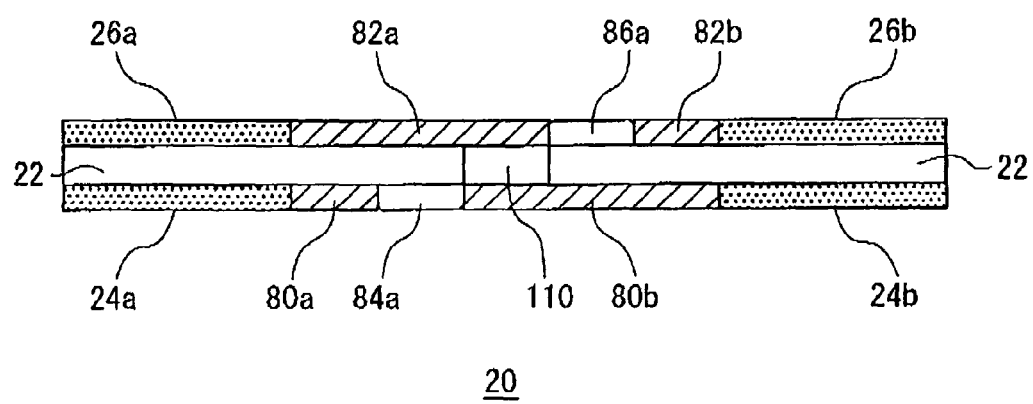
FIG. 11 is a cross-sectional view showing essential parts of a structure of a membrane electrode assembly as used in a seventh embodiment.

In the fifth embodiment, the cells are electrically connected in series to an interconnector, which is provided on an end of the membrane electrode assembly 20. According to a seventh embodiment of the present invention, which corresponds to the fifth embodiment, the cells are electrically connected to each other in series by an interconnector which is provided between adjacent cells. More specifically, with a membrane electrode assembly 20 in the seventh embodiment, an interconnector 110 is provided between adjacent cells as shown in FIG. 11. A current collector 80b and a current collector 82a are more extended than in the fifth embodiment such that the current collector 80b on the anode side and the current collector 82a on the cathode side are disposed counter to each other between the adjacent cells. Thus, the interconnector 110, disposed between the current collector 80b and the current collector 82a, connects the current collector 80b and the current collector 82a electrically.

According to the seventh embodiment, in addition to the advantageous effects of the fifth embodiment, the interconnector is not provided on one end of the membrane electrode assembly 20 but between adjacent cells, so that the electron transfer distance is smaller and thus the voltage loss due to resistance in the current collectors can be reduced.

Eighth Embodiment

Figure 12:
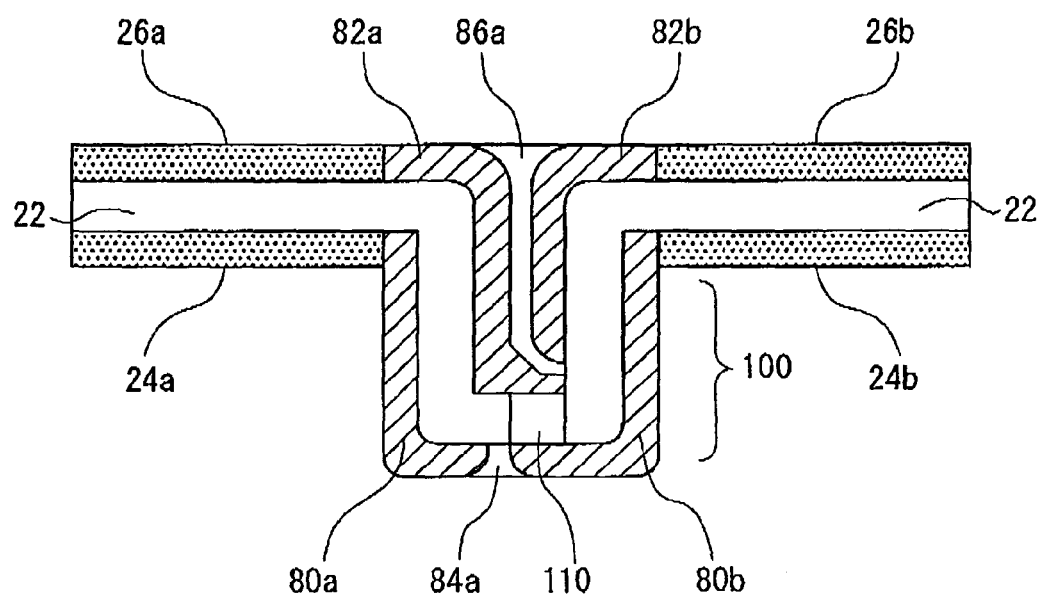
FIG. 12 is a cross-sectional view showing essential parts of a structure of a membrane electrode assembly as used in an eighth embodiment.

In the sixth embodiment, the cells are electrically connected in series to an interconnector, which is provided on an end of the membrane electrode assembly 20. According to an eighth embodiment of the present invention, which corresponds to the sixth embodiment, the cells are electrically connected to each other in series by an interconnector which is provided between adjacent cells. More specifically, with a membrane electrode assembly 20 in the eighth embodiment, an interconnector 110 is provided within the projection 100 between adjacent cells as shown in FIG. 12. A current collector 80b and a current collector 82a are more extended than in the sixth embodiment such that the current collector 80b on the anode side and the current collector 82a on the cathode side are disposed counter to each other between the adjacent cells. Thus, the interconnector 110, disposed between the current collector 80b and the current collector 82a, connects the current collector 80b and the current collector 82a electrically.

According to the eighth embodiment, in addition to the advantageous effects of the sixth embodiment, the interconnector is not provided on one end of the membrane electrode assembly 20 but between adjacent cells, so that the area occupied by the interconnector can be made smaller. As a result, further downsizing of the fuel cell can be achieved.

Ninth Embodiment

Figure 13:
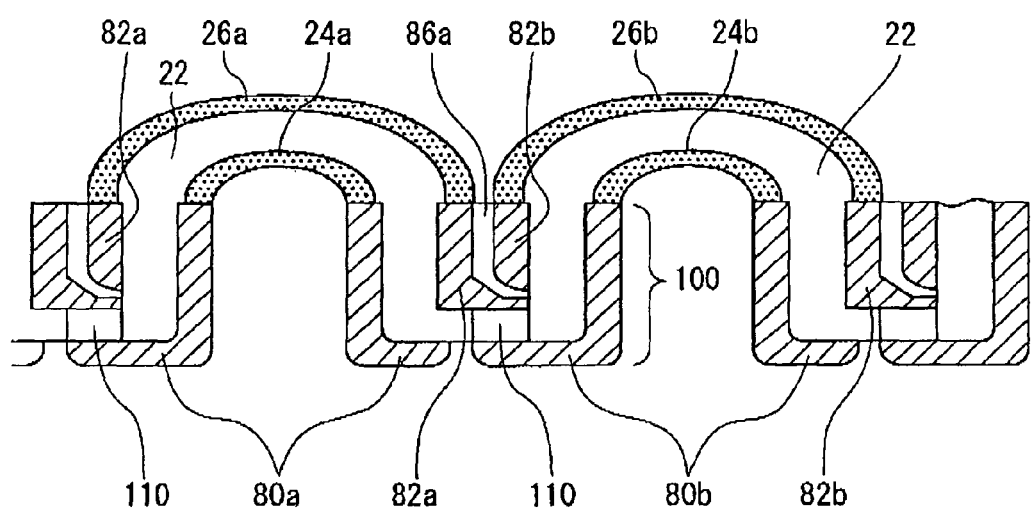
FIG. 13 is a cross-sectional view showing essential parts of a structure of a membrane electrode assembly as used in a ninth embodiment.

Although the membrane electrode assembly 20 of the eighth embodiment has flat cathodes 26a and 26b, the form of the cathodes 26a and 26b may not necessarily be flat. As shown in FIG. 13, the membrane electrode assembly 20 according to a ninth embodiment of the present invention has the cathodes 26a and 26b which are each raised (convexed) in the middle. Also, the peripheral parts of the cathodes 26a and 26b are smoothly curved (rounded portions or R parts).

In this arrangement, even the R part of the current collector necessary to project the projection (electricity connecting means or electrical connector) can be used effectively as an electrode, so that it is possible to increase the effective electrode area relative to the profile area of the fuel cell. As a result, the fuel cell can be smaller but outputting more.

Such an arrangement causes a relative increase in the contact interface with the air, which can be a factor for increasing diffusion polarization, and in the releasing area of generated water as well, so that the diffusion polarization can be reduced and the fuel cell can be smaller and of higher output.

It is to be noted also that when pure hydrogen is supplied as fuel to the anode, the diffusivity of the fuel little matters. Hence, a catalyst layer or gas diffusion layer, which is part of the anode, may be embedded in the recess between a set of projections provided on the anode side. Such an arrangement may improve the strength of the cell.

The cathodes 26a and 26b in the ninth embodiment are each raised (convexed) in the middle, but the form of the cathodes 26a and 26b may be wavy. The above-mentioned advantageous effects is also achieved by a structure in which at least a part of the cathodes 26a and 26b is raised (convexed) relative to the current collector connected to the periphery thereof.

The present invention is not limited to the above-described embodiments only, and it is understood by those skilled in the art that various modifications such as changes in design may be made based on their knowledge and the embodiments added with such modifications are also within the scope of the present invention.

Figure 14:
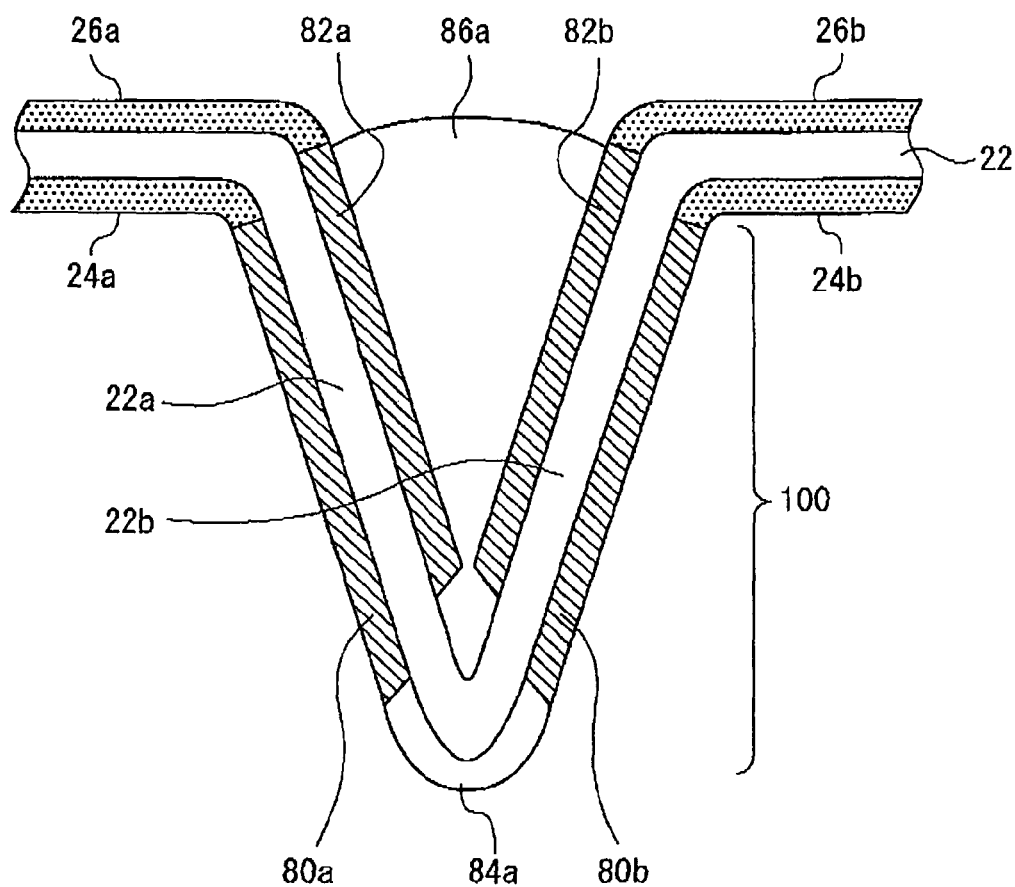
FIG. 14 illustrates a modification of a projection provided in a membrane electrode assembly.
Figure 15:
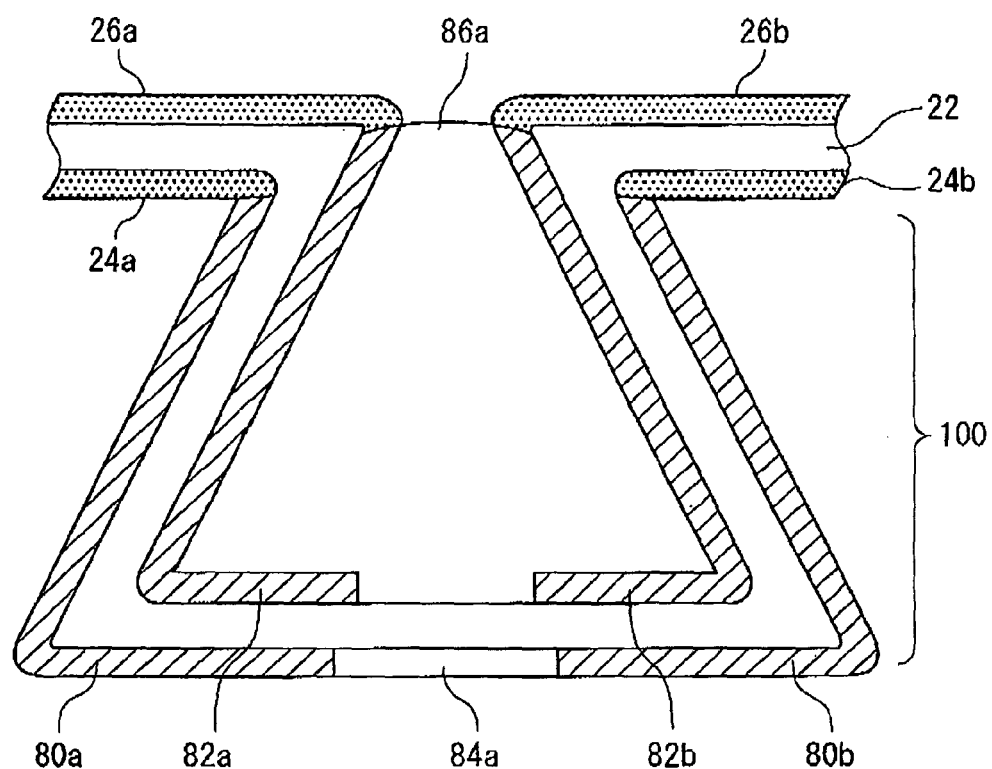
FIG. 15 illustrates another modification of a projection provided in a membrane electrode assembly.
Figure 16:
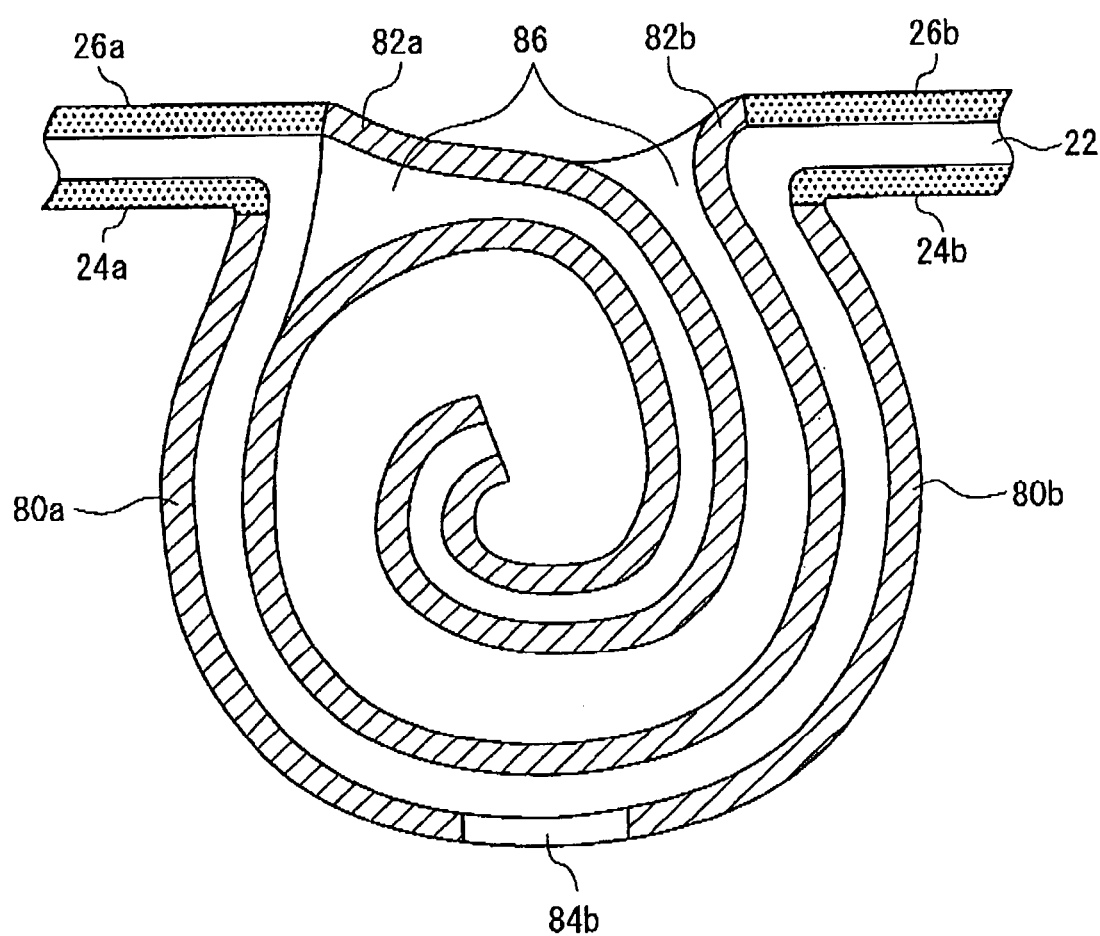
FIG. 16 illustrates still another modification of a projection provided in a membrane electrode assembly.

For example, the form and configuration of the projection 100 are not limited to U-shaped versions as presented in the second, fourth, sixth and eighth embodiments. As shown in FIG. 14, the projection 100 may be triangular, for instance. As shown in FIG. 15, the projection 100 may have two bent portions. As shown in FIG. 16, the current collectors 82a and 82b may be wound within the projection 100, and they may be insulated against each other by an insulator 86. In such an arrangement, the cross section of the current collectors 82a and 82b may be made larger, thereby reducing the voltage loss.

Figure 17:
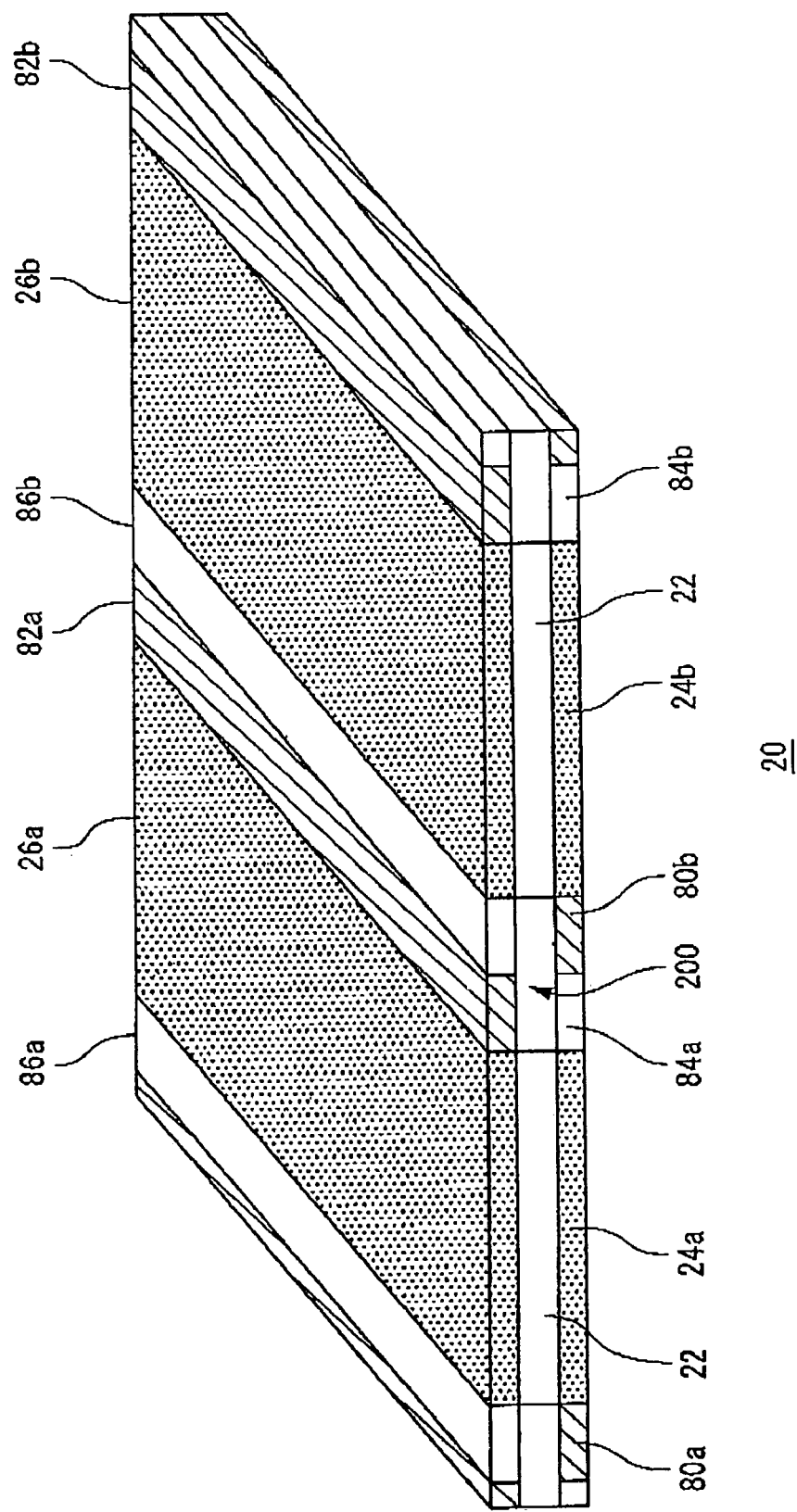
FIG. 17 is a perspective view showing essential parts of a structure of a membrane electrode assembly as used in a modification of the first embodiment.
Figure 18:
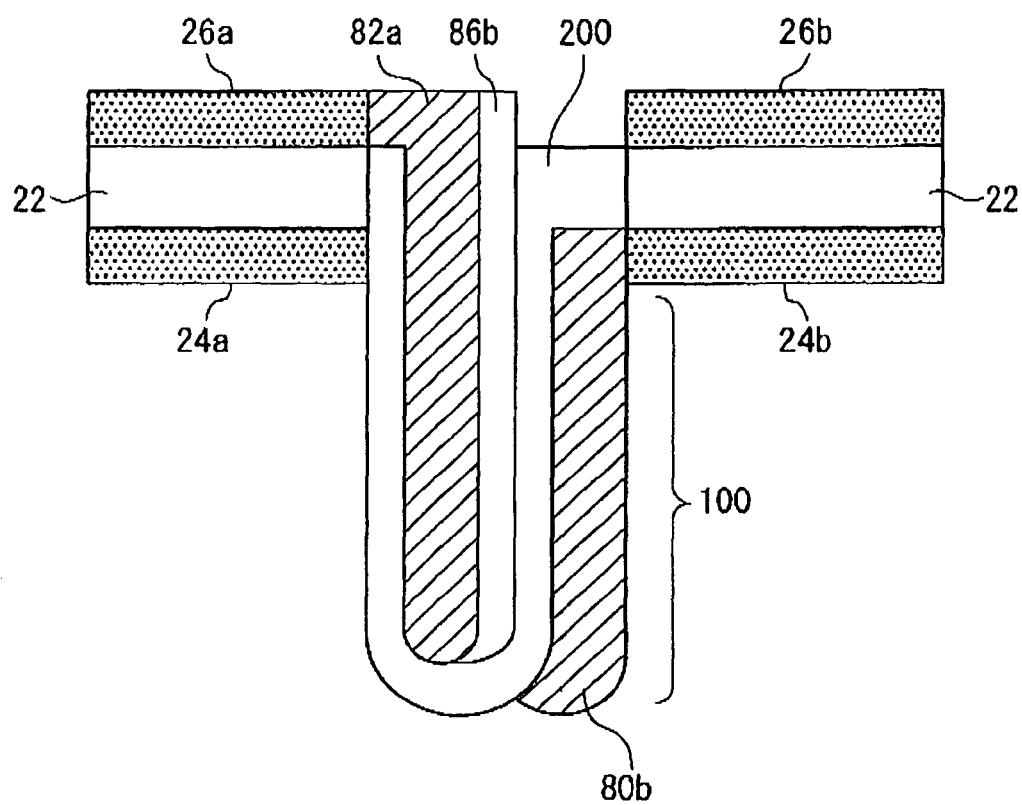
FIG. 18 is a cross-sectional view showing essential parts of a structure of a membrane electrode assembly as used in a modification of the second embodiment.

In the foregoing embodiments, anodes and cathodes are formed on their respective sides of a single electrolyte membrane in correspondence to a plurality of cells, but there may be a plurality of electrolyte membranes separate from each other, each for every group of cells. More specifically, as a modification to the first embodiment, a resin substrate 200, which may be a polyimide or Teflon (registered trademark) sheet, is placed between adjacent cells as shown in FIG. 17. And on one face of the resin substrate 200, a current collector 80b, which is in contact with a side of an anode 24b, and an insulator 84b, which insulates the current collector 80b against an anode 24a, are provided. Provided on the other face of the resin substrate 200 are a current collector 82a, which is in contact with a side of a cathode 26a, and an insulator 86a, which insulates the current collector 82a against a cathode 26b. FIG. 18 is a cross-sectional view showing the essential parts of a structure of a membrane electrode assembly in a modification to the second embodiment. In this case, a folded-back portion is prepared in advance on the resin substrate 200, and then current collectors 82a and 80b and an insulator 86b are formed on the resin substrate 200 the same way as in the second embodiment.

In these modifications, the resin substrate 200 is not prone to swelling, so that separation of and peeling-off between current collectors and insulator can be prevented.

The membrane electrode assembly as described in these modifications may be produced, for instance, by using the following procedure. First, an unprocessed resin substrate is prepared, and necessary holes in the cell portions and the like are made therein by etching or like process. Next, current collectors and insulator are formed on the two faces of the resin substrate between the adjacent cells. Then, the holes in the cell portions are filled with an electrolyte solution. Finally, catalyst layers for cathodes and anodes, respectively, are formed on the respective faces of the electrolyte. Through these processes, the membrane electrode assembly in a modification of the second embodiment as shown in FIG. 18 can be produced.

It is not necessary that a plurality of cells constituting a fuel cell be all connected in series. For example, each half of the plurality of cells may be connected in series, and the set of the series-connected cells may be connected in parallel.

While the preferred embodiments of the present invention and the modifications to the embodiments have been described using specific terms, such description is for illustrative purposes only, and it is to be understood that changes and variations may be further made without departing from the spirit or scope of the appended claims.

What is claimed is:

1. A fuel cell, comprising:
   a plurality of cells arranged in a plane, each cell having an electrolyte membrane, an anode provided on one face of the electrolyte membrane and a cathode provided on the other face of the electrolyte membrane, the anode and cathode each having a major surface opposite to the electrolyte membrane; and an electrical connector which connects the cells disposed adjacent to one another, wherein the major surface of the anode and the cathode opposite to the electrolyte membrane is exposed to fuel and oxidant, respectively, wherein said electrical connector is in contact with an entirety or a part of the surface that define a thickness of the anode and cathode so as to electrically connect said electrical connector to the anode and the cathode of each cell, and said electrical connector comprises:
- a part that is in contact with an entirety or a part of the surface that defines the thickness of one electrode and projects so as to be convex with respect to the exposed surface of the other electrode, and
- a part that is in contact with an entirety or a part of the surface that defines the thickness of said other electrode and projects so as to be convex with respect to the exposed surface of said other electrode.

2. A fuel cell according to claim 1, wherein said electrical connector projects so as to be convex with respect to the exposed surface of the anode.

3. A fuel cell according to claim 2, wherein at least a part of the cathode is convex relative to the electrical connector connected to the periphery thereof.

4. A fuel cell according to claim 1, wherein said electrical connector includes an interconnector which electrically connects the adjacent cells in series, and
wherein the interconnector is formed between the adjacent cells.

5. A fuel cell according to claim 2, wherein said electrical connector includes an interconnector which electrically connects the adjacent cells in series, and
wherein the interconnector is formed between the adjacent cells.

6. A fuel cell according to claim 3, wherein said electrical connector includes an interconnector which electrically connects the adjacent cells in series, and
wherein the interconnector is formed between the adjacent cells.

* * * * *